(12) United States Patent
Hastilow

(10) Patent No.: US 10,563,979 B2
(45) Date of Patent: Feb. 18, 2020

(54) METHODS, APPARATUS, COMPUTER PROGRAMS AND NON-TRANSITORY COMPUTER READABLE STORAGE MEDIUMS FOR CONTROLLING A ROBOT WITHIN A VOLUME

(71) Applicant: ROLLS-ROYCE plc, London (GB)

(72) Inventor: Neil K. Hastilow, Uttoxeter (GB)

(73) Assignee: ROLLS-ROYCE PLC, London (GB)

( * ) Notice: Subject to any disclaimer, the term of this patent is extended or adjusted under 35 U.S.C. 154(b) by 297 days.

(21) Appl. No.: 15/614,722

(22) Filed: Jun. 6, 2017

(65) Prior Publication Data
US 2018/0003488 A1    Jan. 4, 2018

(30) Foreign Application Priority Data
Jun. 30, 2016   (GB) .................................. 1611347.4

(51) Int. Cl.
*B23Q 17/22*    (2006.01)
*B25J 9/16*    (2006.01)
(Continued)

(52) U.S. Cl.
CPC ...... *G01B 11/2522* (2013.01); *B23Q 17/2233* (2013.01); *B25J 9/1666* (2013.01);
(Continued)

(58) Field of Classification Search
CPC ... B23Q 17/2233; B25J 9/1666; B25J 9/1671; G01B 11/2522; G05B 2219/39014; G05B 2219/39024; G06F 17/156
See application file for complete search history.

(56) References Cited

U.S. PATENT DOCUMENTS 6,472,838 B1 * 10/2002 Shikazono ............. B25J 9/1602
   318/560
8,073,528 B2 * 12/2011 Zhao ..................... B25J 9/1689
   600/424

(Continued)

FOREIGN PATENT DOCUMENTS

CN    104865897    8/2015
EP    1462896    9/2004
(Continued)

OTHER PUBLICATIONS

Great Britain Search Report dated Dec. 16, 2016 issued in GB Patent Application No. 1611347.4.

*Primary Examiner* — Abdelmoniem I Elamin
(74) *Attorney, Agent, or Firm* — Oliff PLC

(57) ABSTRACT

A method of controlling a robot within a volume, the method comprising: receiving a three dimensional model including a model of the robot and a model of the volume in which the robot is configured to move within; defining a plurality of positions within the model of the volume to which the robot is moveable to, the plurality of positions being identified by an operator; receiving scanned three dimensional data of the robot and at least a part of the volume; determining a transformation algorithm using the three dimensional model and the scanned three dimensional data; applying the transformation algorithm to one or more positions of the plurality of positions to provide one or more transformed positions; and controlling movement of the robot using one or more of the transformed positions.

18 Claims, 5 Drawing Sheets

(51) Int. Cl.
*G01B 11/25* (2006.01)
*G06F 17/15* (2006.01)
(52) U.S. Cl.
CPC ... B25J 9/1671 (2013.01); *G05B 2219/39014* (2013.01); *G05B 2219/39024* (2013.01); *G06F 17/156* (2013.01)

(56) References Cited

U.S. PATENT DOCUMENTS

2009/0088634 A1* 4/2009 Zhao ................. B25J 9/1689
                                                    600/427
2017/0197308 A1* 7/2017 Azuma ................. G05B 19/42

FOREIGN PATENT DOCUMENTS

| EP | 2783812 A2 * | 10/2014 | ............ B25J 9/1697 |
| EP | 2684651 A2 * | 5/2015 | ............ B25J 9/1697 |
| WO | 2004071717 | 8/2004 | |

* cited by examiner

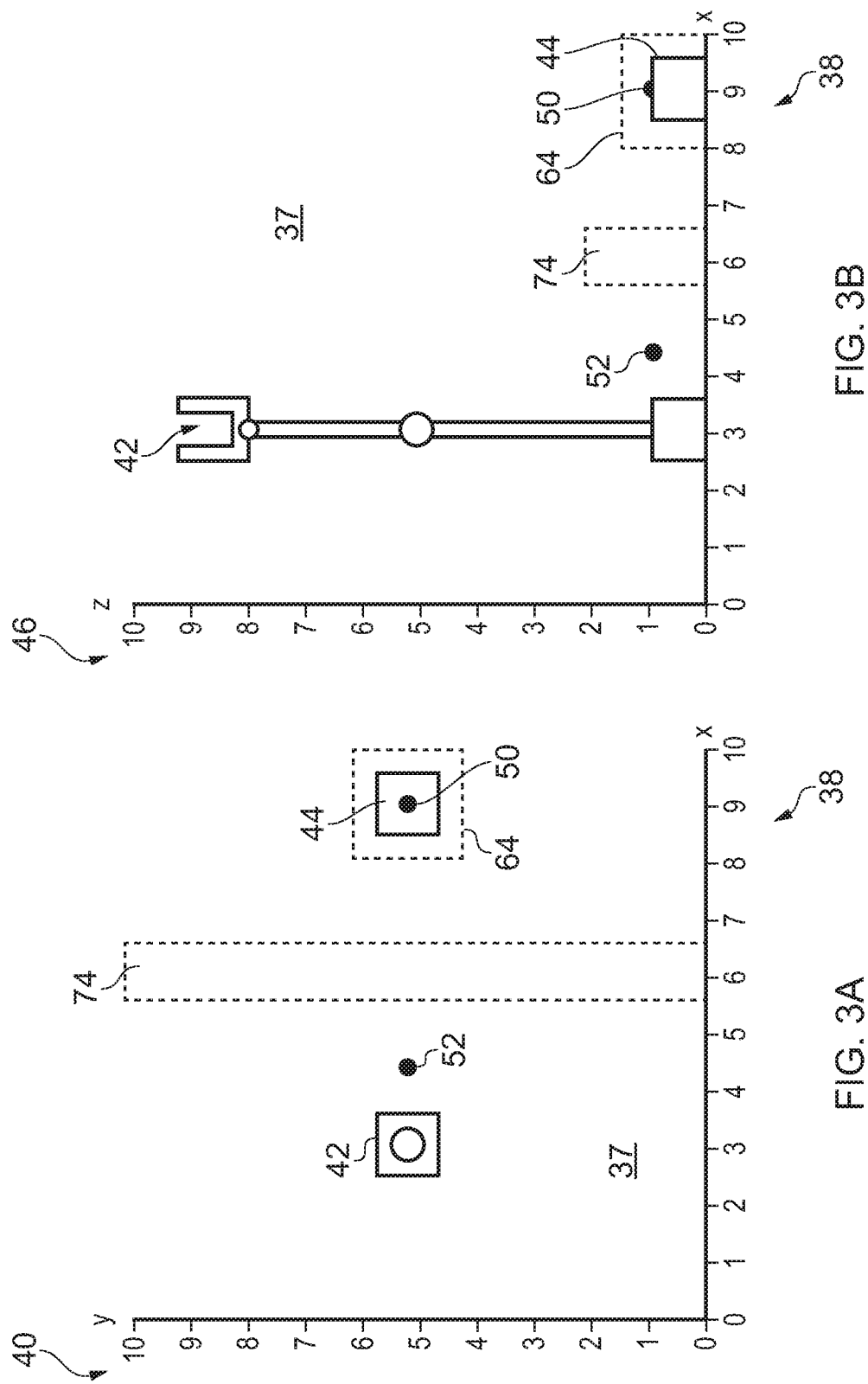

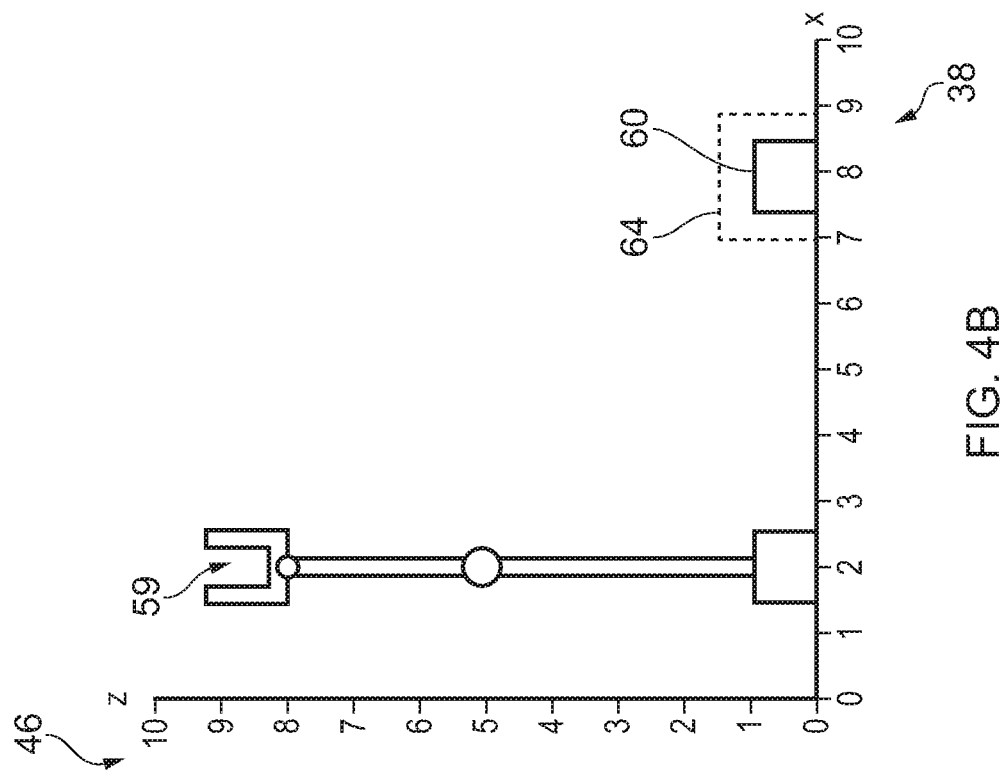
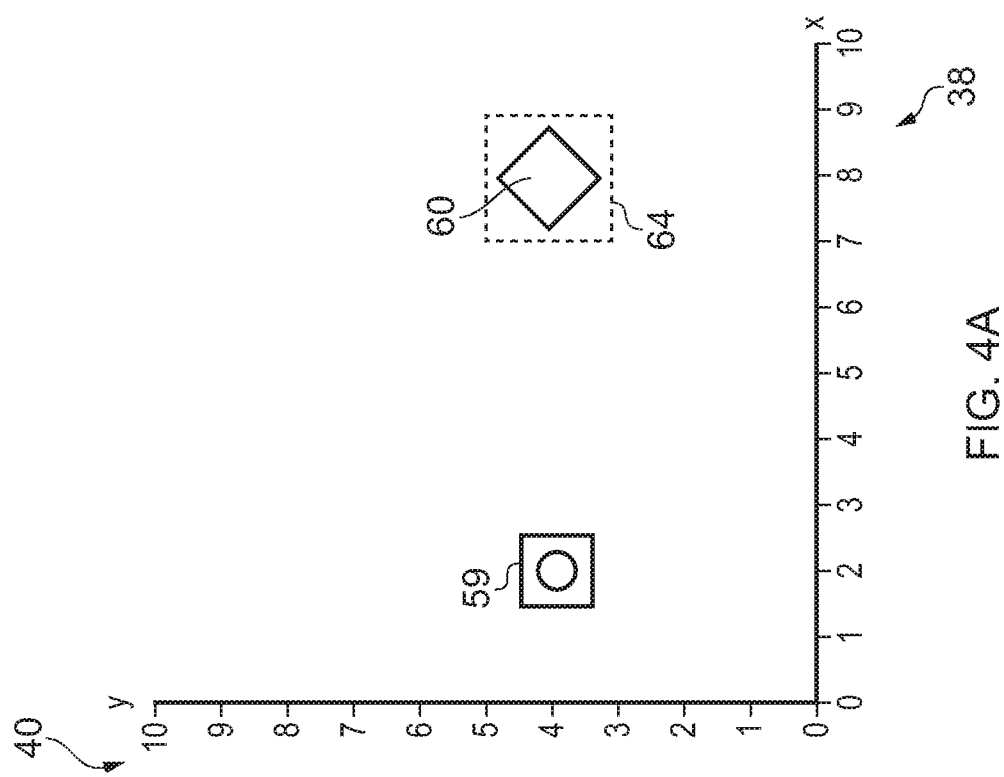

METHODS, APPARATUS, COMPUTER PROGRAMS AND NON-TRANSITORY COMPUTER READABLE STORAGE MEDIUMS FOR CONTROLLING A ROBOT WITHIN A VOLUME

CROSS-REFERENCE TO RELATED APPLICATIONS

This application is based upon and claims the benefit of priority from British Patent Application Number 1611347.4 filed 30 Jun. 2016, the entire contents of which are incorporated by reference.

FIELD OF THE DISCLOSURE

The present disclosure concerns methods, apparatus, computer programs, and non-transitory computer readable storage mediums for controlling a robot within a volume.

BACKGROUND

Robots may be configured to move between a plurality of positions. For example, a 'pick and place' robot may be configured to move items between different positions within a production environment. Usually, the robot is programmed to move along the most efficient route between the positions, and may be programmed to avoid entering 'keep out zones'.

The positions are 'taught' to the robot by manually moving or driving the robot to the position and then storing the location or robotic limb position. The robot may use generic algorithms to move to whichever position is instructed by a controller of that robot. A position may be associated with one or more other positions to allow the robot to enter machines or approach sensitive equipment safely. The robot may have hundreds of target positions leading to a vast number of positions that need to be taught to the robot.

The equipment or volume that the robot is servicing may have to be out of operation ('offline') while the robot is taught the positions and this may take several hours or days. Furthermore, since the teaching process is a manual process, one or more taught positions may be erroneous leading to issues relating to safety and potential damage to objects within the volume. Additionally, the teaching process may need to be repeated to correct the erroneous positions.

BRIEF SUMMARY

According to various examples there is provided a method of controlling a robot within a volume, the method comprising: receiving a three dimensional model including a model of the robot and a model of the volume in which the robot is configured to move within; defining a plurality of positions within the model of the volume to which the robot is moveable to, the plurality of positions being identified by an operator; receiving scanned three dimensional data of the robot and at least a part of the volume; determining a transformation algorithm using the three dimensional model and the scanned three dimensional data; applying the transformation algorithm to one or more positions of the plurality of positions to provide one or more transformed positions; and controlling movement of the robot using one or more of the transformed positions.

The volume may include a sub-volume which the robot is not to enter. The method may further comprise defining the sub-volume within the three dimensional model of the volume.

The method may further comprise applying the transformation algorithm to the sub-volume within the three dimensional model of the volume to provide a transformed sub-volume.

Controlling movement of the robot may include controlling movement of the robot to not enter the sub-volume using the transformed sub-volume.

Controlling movement of the robot may include controlling movement of the robot between a first transformed position and a second position.

The second position may be a second transformed position. The second position may be a position of the plurality of positions.

The method may further comprise controlling a three dimensional scanner to scan the robot and at least a part of the volume to generate the scanned three dimensional data.

The robot may be a pick and place robot.

The robot may be a point to point robot.

According to various examples there is provided apparatus for controlling a robot within a volume, the apparatus comprising a controller configured to: receive a three dimensional model including a model of the robot and a model of the volume in which the robot is configured to move within; define a plurality of positions within the model of the volume to which the robot is moveable to, the plurality of positions being identified by an operator; receive scanned three dimensional data of the robot and at least a part of the volume; determine a transformation algorithm using the three dimensional model and the scanned three dimensional data; apply the transformation algorithm to one or more positions of the plurality of positions to provide one or more transformed positions; and control movement of the robot using one or more of the transformed positions.

The volume may include a sub-volume which the robot is not to enter. The controller may be configured to define the sub-volume within the three dimensional model of the volume.

The controller may be configured to apply the transformation algorithm to the sub-volume within the three dimensional model of the volume to provide a transformed sub-volume.

The controller may be configured to control movement of the robot to not enter the sub-volume using the transformed sub-volume.

The controller may be configured to control movement of the robot between a first transformed position and a second position.

The second position may be a second transformed position. The second position may be a position of the plurality of positions.

The controller may be configured to control a three dimensional scanner to scan the robot and at least a part of the volume to generate the scanned three dimensional data.

The apparatus may further comprise the robot. The robot may be a pick and place robot. The robot may be a point to point robot.

According to various examples there is provided a computer program that, when read by a computer, causes performance of the method as described in any of the preceding paragraphs.

According to various examples there is provided a non-transitory computer readable storage medium comprising computer readable instructions that, when read by a computer, cause performance of the method as described in any of the preceding paragraphs.

The skilled person will appreciate that except where mutually exclusive, a feature described in relation to any one of the above aspects may be applied mutatis mutandis to any other aspect. Furthermore except where mutually exclusive any feature described herein may be applied to any aspect and/or combined with any other feature described herein.

BRIEF DESCRIPTION OF THE DRAWINGS

Embodiments will now be described by way of example only, with reference to the Figures, in which:

FIG. 3A illustrates a plan view of a graphical representation of a three dimensional model according to various examples;

FIG. 3B illustrates a side view of the graphical representation of the three dimensional model illustrated in FIG. 3A;

FIG. 4A illustrates a plan view of a graphical representation of scanned three dimensional data according to various examples;

FIG. 4B illustrates a side view of the graphical representation of the scanned three dimensional data illustrated in FIG. 4A.

DETAILED DESCRIPTION OF EMBODIMENTS

In the following description, the terms 'connected' and 'coupled' mean operationally connected and coupled. It should be appreciated that there may be any number of intervening components between the mentioned features, including no intervening components.

Figure 1:
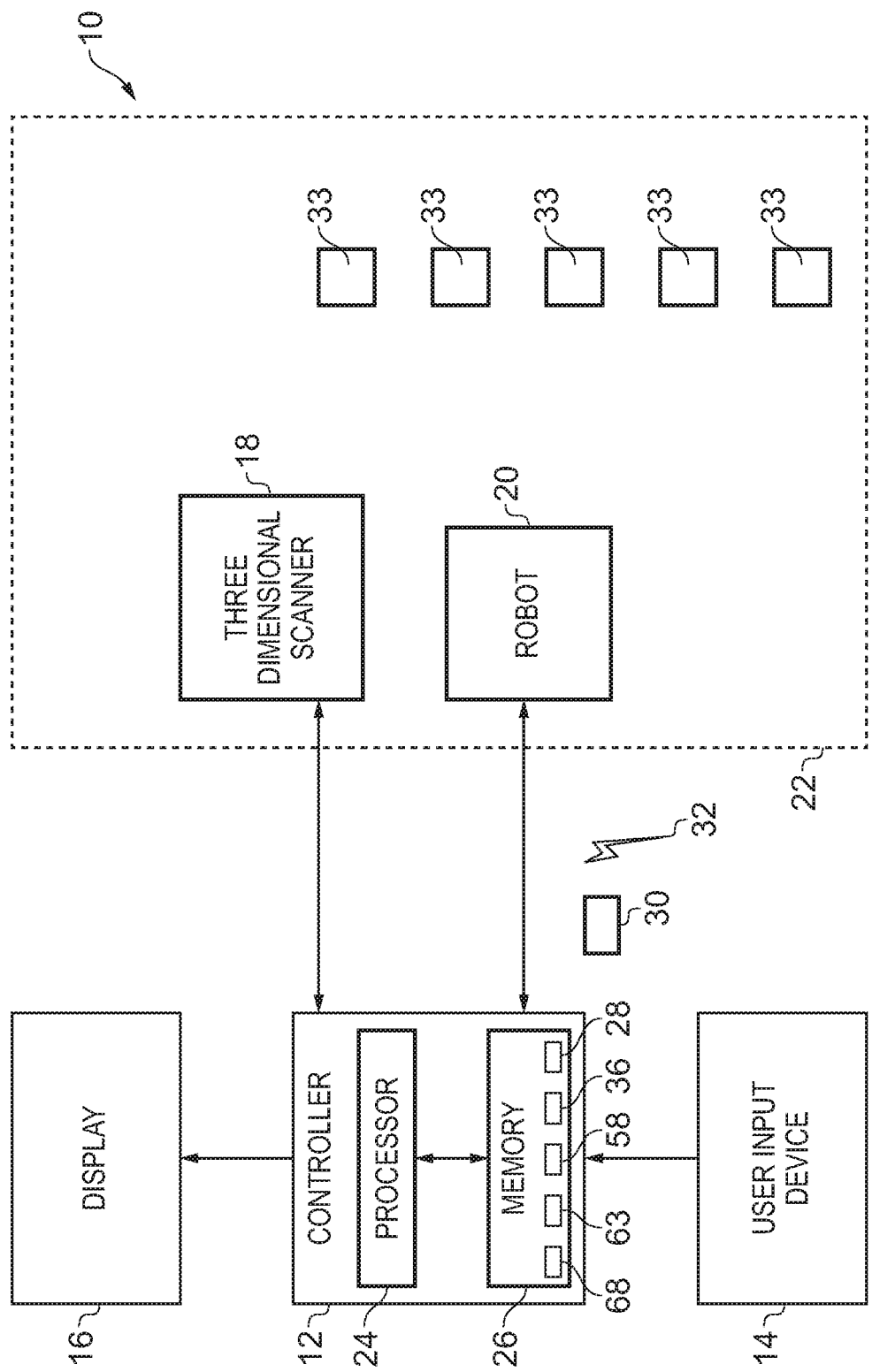
FIG. 1 illustrates a schematic diagram of apparatus for controlling a robot within a volume according to various examples.

FIG. 1 illustrates an apparatus 10 including a controller 12, a user input device 14, a display 16, a three dimensional scanner 18 and a robot 20. In some examples, the apparatus 10 may be a module. As used herein, the wording 'module' refers to a device or apparatus where one or more features are included at a later time and, possibly, by another manufacturer or by an end user. For example, where the apparatus 10 is a module, the apparatus 10 may only include the controller 12, and the remaining features (such as the user input device 14, the display 16, the three dimensional scanner 18 and the robot 20) may be added by another manufacturer, or by an end user.

The controller 12, the user input device 14, the display 16, the three dimensional scanner 18 and the robot 20 may be coupled to one another via a wireless link and may consequently comprise transceiver circuitry and one or more antennas. Additionally or alternatively, the controller 12, the user input device 14, the display 16, the three dimensional scanner 18 and the robot 20 may be coupled to one another via a wired link and may consequently comprise interface circuitry (such as a Universal Serial Bus (USB) socket). It should be appreciated that the controller 12, the user input device 14, the display 16, the three dimensional scanner 18 and the robot 20 may be coupled to one another via any combination of wired and wireless links.

Figure 2:
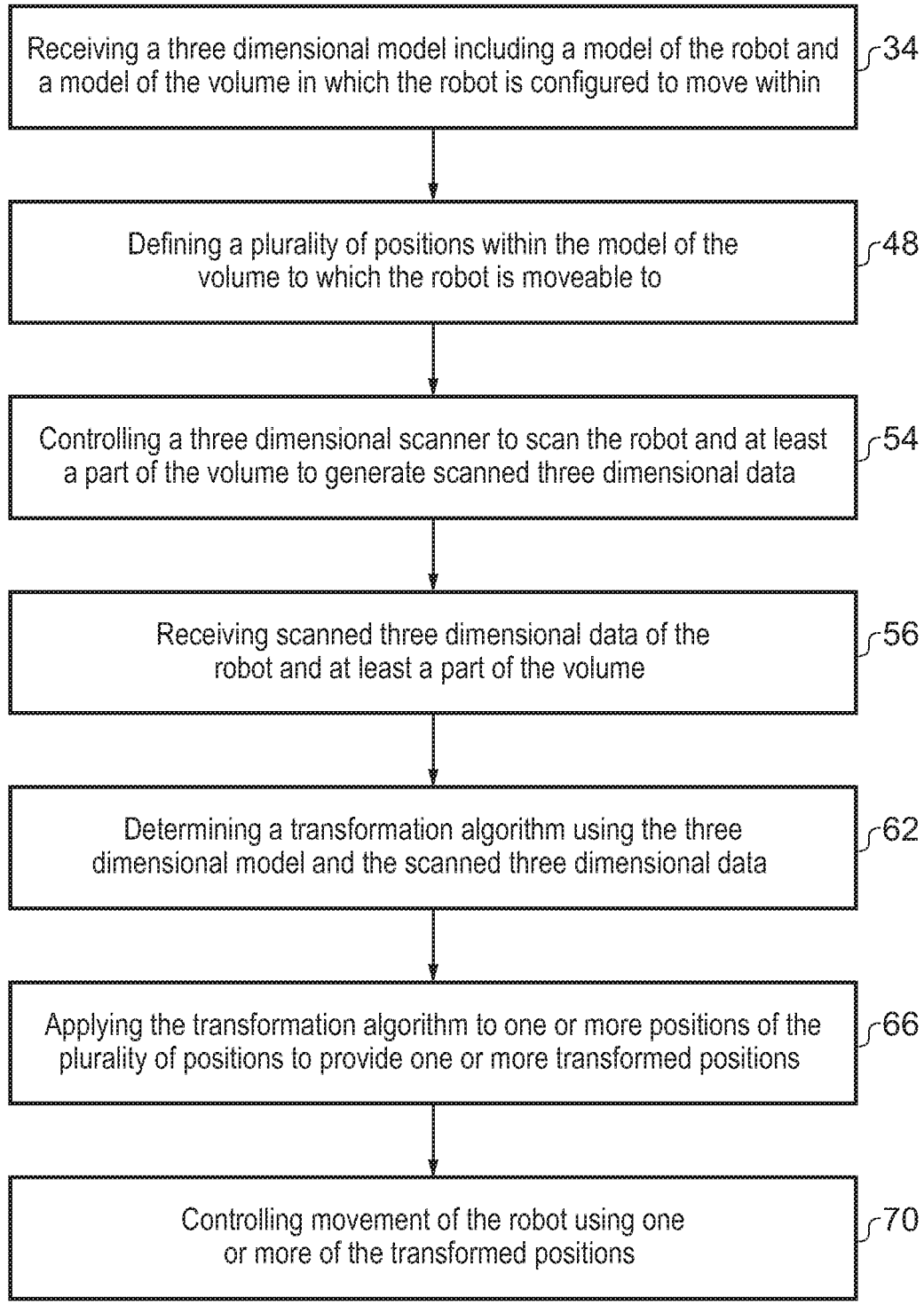
FIG. 2 illustrates a flow diagram of a method of controlling a robot within a volume according to various examples.
Figure 5:
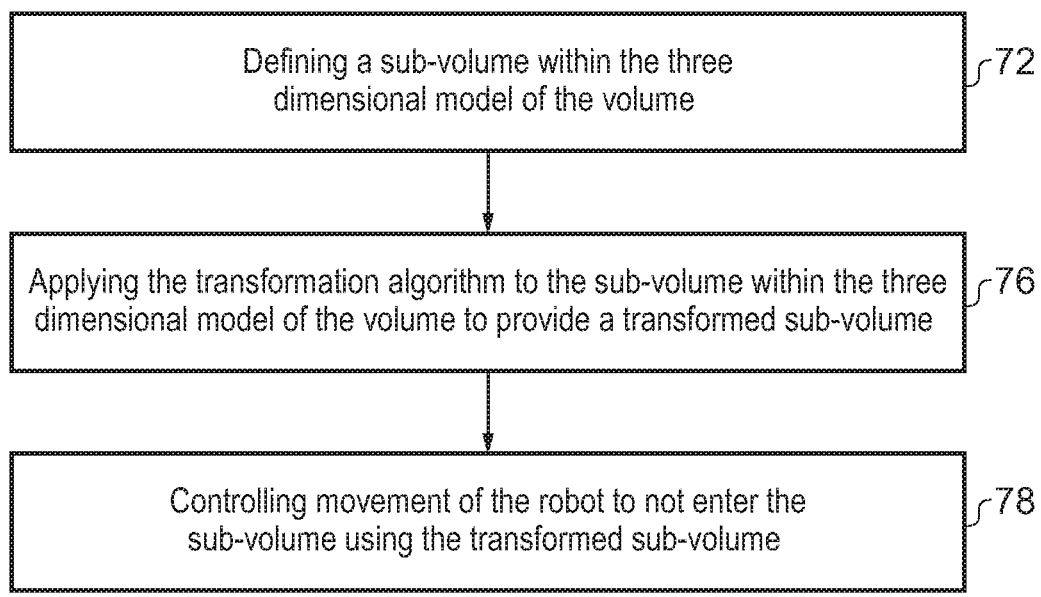
FIG. 5 illustrates a flow diagram of another method of controlling a robot within a volume according to various examples.

The controller 12 may comprise any suitable circuitry to cause performance of the methods described herein and as illustrated in FIGS. 2 and 5. The controller 12 may comprise: control circuitry; and/or processor circuitry; and/or at least one application specific integrated circuit (ASIC); and/or at least one field programmable gate array (FPGA); and/or single or multi-processor architectures; and/or sequential/parallel architectures; and/or at least one programmable logic controllers (PLCs); and/or at least one microprocessor; and/or at least one microcontroller; and/or a central processing unit (CPU); and/or a graphics processing unit (GPU), to perform the methods.

In various examples, the controller 12 may comprise at least one processor 24 and at least one memory 26. The memory 26 stores a computer program 28 comprising computer readable instructions that, when read by the processor 24, causes performance of the methods described herein, and as illustrated in FIGS. 2 and 5. The computer program 28 may be software or firmware, or may be a combination of software and firmware.

The processor 24 may include at least one microprocessor and may comprise a single core processor, may comprise multiple processor cores (such as a dual core processor or a quad core processor), or may comprise a plurality of processors (at least one of which may comprise multiple processor cores).

The memory 26 may be any suitable non-transitory computer readable storage medium, data storage device or devices, and may comprise a hard disk and/or solid state memory (such as flash memory). The memory 26 may be permanent non-removable memory, or may be removable memory (such as a universal serial bus (USB) flash drive or a secure digital card). The memory 26 may include: local memory employed during actual execution of the computer program 28; bulk storage; and cache memories which provide temporary storage of at least some computer readable or computer usable program code to reduce the number of times code may be retrieved from bulk storage during execution of the code.

The computer program 28 may be stored on a non-transitory computer readable storage medium 30. The computer program 28 may be transferred from the non-transitory computer readable storage medium 30 to the memory 26. The non-transitory computer readable storage medium 30 may be, for example, a USB flash drive, a secure digital (SD) card, an optical disc (such as a compact disc (CD), a digital versatile disc (DVD) or a Blu-ray disc). In some examples, the computer program 28 may be transferred to the memory 26 via a signal 32 (which may be a wireless signal or a wired signal).

Input/output devices may be coupled to the apparatus 10 either directly or through intervening input/output controllers. Various communication adaptors may also be coupled to the controller 12 to enable the apparatus 10 to become coupled to other apparatus or remote printers or storage devices through intervening private or public networks. Non-limiting examples include modems and network adaptors of such communication adaptors.

The user input device 14 may comprise any suitable device for enabling an operator to at least partially control the apparatus 10. For example, the user input device 14 may comprise one or more of a keyboard, a keypad, a touchpad, a touchscreen display, and a computer mouse. The controller 12 is configured to receive control signals from the user input device 14.

The display 16 may be any suitable device for conveying information to an operator of the apparatus 10. For example, the display 16 may be a liquid crystal display, a light emitting diode display, an active matrix organic light emitting diode display, a thin film transistor display, or a cathode ray tube display. The controller 12 is arranged to provide a signal to the display 16 to cause the display 16 to convey information to the operator.

The three dimensional scanner 18 may be any suitable device for scanning the volume 22 to generate three dimensional data of the robot 20 and at least a part of the volume 22 (and consequently, any objects within the volume 22). The three dimensional scanner 18 comprises an emitter such as a laser, a structured light emitter, an ultrasound emitter, or an X-ray emitter. The three dimensional scanner 18 also includes a sensor such as a complementary metal oxide semiconductor (CMOS) sensor, a charge coupled device (CCD) camera, or a piezoelectric transducer.

The three dimensional scanner 18 may be located within the volume 22 or may be located outside of the volume 22. The controller 12 is configured to control the operation of the three dimensional scanner 18 and to receive scanned three dimensional data from the three dimensional scanner 18. The scanned three dimensional data received by the controller 12 may be point cloud data, or may be a three dimensional model (such as a polygon mesh model) where the three dimensional scanner 18 includes a processor that performs post-processing on the generated point cloud data.

In some examples, the three dimensional scanner 18 may comprise a plurality of scanners that are located at different positions in, or around, the volume 22. This may advantageously enable the three dimensional scanner 18 to obtain data for a greater portion of the volume 22 since the line of sight of each of the plurality of scanners will be different.

The robot 20 may be a 'pick and place' robot or a 'point to point' robot and may comprise one or more limbs that are moveable within the volume 22. For example, where the robot 20 is a pick and place robot, the robot 20 may include an articulated robotic arm having a clamp for repositioning objects within the volume 22. By way of another example, the robot 20 may be a snake arm robot (which may also be referred to as a continuum robot) that functions as a 'point to point' robot and is configured to perform machining or inspection within the volume 22. As described in greater detail in the following paragraphs, the controller 12 is configured to control the operation of the robot 20 within the volume 22.

The volume 22 may be any three dimensional space in which the robot 20 is moveable. For example, the volume 22 may be an interior space of an object (such as a gas turbine engine), may be part of a room within a building, may be a room within a building, or may be the whole volume defined by a building. The volume 22 includes one or more objects 33 that may be repositioned by the robot 20 within the volume 22. In some examples, the one or more objects 33 may be components of a gas turbine engine (for example, the objects 33 include fan blades, compressor blades, turbine blades, vanes, or shafts of a gas turbine engine). The one or more objects 33 may include objects that are not to be repositioned by the robot 20. For example, the one or more objects 33 may include machinery within the volume 22.

FIG. 2 illustrates a flow diagram of a method of controlling the robot 20 within the volume 22 according to various examples.

At block 34, the method includes receiving a three dimensional model 36 including a model of the robot 20 and a model of the volume 22. The three dimensional model 36 may be received from another apparatus and then stored in the memory 26. Alternatively, the three dimensional model 36 may be generated by an operator of the apparatus 10 using computer aided design (CAD) software and then stored in the memory 26. The controller 12 may receive the three dimensional model 36 by loading the three dimensional model 36 from the memory 26.

FIGS. 3A and 3B illustrate a graphical representation of a three dimensional model 36 according to an example.

FIG. 3A illustrates a model 37 of the volume 22 including an X axis 38, a Y axis 40, and a model 44 of an object 33. FIG. 3A also illustrates a model 42 of the robot 20. The centre of the model 42 of the robot 20 is located at a position of X=3, Y=5. The centre of the model 44 of the object 33 is located at a position of X=9, Y=5.

FIG. 3B illustrates the model 37 of the volume 22 including the X axis 38, a Z axis 46, and the model 44 of the object 44. FIG. 3B also illustrates the model 42 of the robot 20. The model 42 of the robot 20 extends from the position X=3, Z=0 to the position X=3, Z=9. The model 44 of the object 33 extends from the position X=9, Z=0 to the position X=9, Z=1.

Returning to FIG. 2, at block 48, the method includes defining a plurality of positions to which the robot 20 is moveable to. For example, the controller 12 may control the display 16 to display the graphical representations illustrated in FIGS. 3A and 3B. An operator may manipulate the user input device 14 to identify positions that the robot 20 is to be moved to within the volume 22. The controller 12 may receive the control signal from the user input device 14 and use the control signal to define the identified positions within the three dimensional model 36.

It should be appreciated that a defined position may be a final destination or target location for the robot 20 (for example, a position where a pick and place robot places an object), or may be a position that defines an intermediate position between a starting point and a final destination (for example, an entry position to enable the robot 20 to enter a cavity within an object, or a starting position to enable the robot 20 to approach sensitive equipment).

For example, a user may identify a first position 50 and a second position 52 within the three dimensional model 36 using the user input device 14. The first position 50 is a current position of the model 44 of the object 33 and is located on a surface of the model 44 of the object 33. The second position 52 is a target location for the object 33 to be moved to. The controller 12 receives the control signal from the user input device 14 and defines the location of the first position 50 as X=9, Y=5, Z=1, and the location of the second position 52 as X=4.5, Y=5, Z=1. It should be appreciated that the controller 12 may define the location of more than two positions and may define the location of tens or hundreds of positions for example.

At block 54, the method may include controlling the three dimensional scanner 18 to scan the robot 20 and at least a part of the volume 22 to generate scanned three dimensional data. For example, the controller 12 may control the three dimensional scanner 18 to scan the robot 20, the volume 22 and the one or more objects 33 to generate scanned three dimensional data.

At block 56, the method includes receiving the scanned three dimensional data. For example, the controller 12 may receive scanned three dimensional data 58 from the three dimensional scanner 18 and then store the scanned three dimensional data 58 in the memory 26.

FIGS. 4A and 4B illustrate graphical representations of scanned three dimensional data of the volume 22 according to an example. The X axis 38, Y axis 40, and Z axis 46 illustrated in FIGS. 4A and 4B are the same as the X axis 38, Y axis 40, and Z axis 46 illustrated in FIGS. 3A and 3B.

FIG. 4A illustrates the X axis 38, the Y axis 40, a graphical representation 59 of scanned data of the robot 20, and a graphical representation 60 of scanned data of the object 33. The centre of the graphical representation 59 of the robot 20 is located at a position of X=2, Y=4. The centre of the graphical representation 60 of the object 33 is located at a position of X=8, Y=4. The graphical representation 60 of the object 33 is oriented at an angle of forty five degrees about the Z axis 46 relative to the model 44 illustrated in FIG. 3A.

FIG. 4B illustrates the X axis 38, the Z axis 46, the graphical representation 59 of the robot 20, and the graphical representation 60 of the object 44. The graphical representation 59 of the robot 20 extends from the position X=2, Z=0 to the position X=2, Z=9. The graphical representation 60 of the object 33 extends from the position X=8, Z=0 to the position X=8, Z=1.

Returning to FIG. 2, at block 62 the method includes determining a transformation algorithm using the three dimensional model 36 and the scanned three dimensional data 58. The transformation algorithm may be determined for the whole of the volume 22, or may be determined for a part of the volume 22. In some examples, the method may include determining a plurality of transformation algorithms for a plurality of sub-volumes within the volume 22 respectively. Furthermore, it should be appreciated that one or more sub-volumes within the volume 22 may not have a transformation algorithm. The transformation algorithm may include scaling, and/or rotation, and/or translation.

The controller 12 may align the three dimensional model 36 with the scanned three dimensional data 58 and then derive a transformation algorithm 63 by comparing corresponding reference points in the three dimensional model 36 and the scanned three dimensional data 58. The controller 12 may use one or more objects 33 that are not to be moved by the robot 20 (such as machinery within the volume 22) as reference points for deriving the transformation algorithm 63. The controller 12 may store the transformation algorithm 63 in the memory 26.

In the example illustrated in FIGS. 3A, 3B, 4A and 4B, the controller 12 may determine a transformation algorithm 63 of X−1 and Y−1. Additionally, for a sub-volume 64 that includes the model 44 of the object 33 and the graphical representation 60 of the object 33, the controller 12 may determine a transformation algorithm 63 of X−1, Y−1, and a rotation about the Z axis 46 of forty five degrees.

At block 66, the method includes applying the transformation algorithm 63 to the plurality of positions to provide a plurality of transformed positions 68. For example, the controller 12 may apply the transformation algorithm of X−1, Y−1, and a rotation about the Z axis 46 through forty five degrees to the first position 50 to provide a first transformed position. The controller 12 may apply the transformation algorithm of X−1, Y−1 to the second position 52 to provide a second transformed position. The controller 12 may also apply a transformation algorithm (such as X−1, Y−1) to the model 42 of the robot 20 and to the model 44 of the object 33.

The controller 12 may store the plurality of transformed positions 68 in the memory 26.

At block 70, the method includes controlling movement of the robot 20 using one or more transformed positions of the plurality of transformed positions 68. For example, the controller 12 may control the robot 20 to move to the first transformed position, control the robot 20 to pick up the object 33, control the robot 20 to move to the second transformed position, and then control the robot 20 to release the object 33. Where the robot 20 operates using Cartesian coordinates as an input, the robot 20 may directly use the transformed positions. Where the robot 20 operates using limb position as an input, the controller 12 or the robot 20 may convert the transformed positions into limb positions.

The apparatus 10 and the above described method may provide several advantages. First, the apparatus 10 and the method may minimise production interruptions where the volume 22 is a production environment. In particular, blocks 34, 48, 54, 56, 62 and 66 may be performed relatively quickly when compared to a human operator teaching the robot 20 the positions. Second, the robot 20 may be relatively accurate in moving between positions due to the use of one or more transformation algorithms generated through the use of digital measurement. Third, the accuracy of the robot 20 may result in the robot 20 being relatively safe, reliable and less likely to cause damage to the one or more objects 33.

FIG. 5 illustrates a flow diagram of another method of controlling the robot 20 within the volume 22.

At block 72, the method includes defining a sub-volume within the three dimensional model 36. Block 72 may be performed between blocks 34 and 48, or between blocks 48 and 54.

By way of an example, an operator may operate the user input device 14 to identify the sub-volume 74 illustrated in FIGS. 3A and 3B. The controller 12 receives the control signal from the user input device 14 and defines the sub-volume within the three dimensional model 36. For example, the controller 12 may define the sub-volume 74 illustrated in FIGS. 3A and 3B as extending between X=5.5 and X=6.5, between Y=0 and Y=10, and between Z=0 and Z=2.

At block 76, the method includes applying the transformation algorithm 63 to the sub-volume 74 within the three dimensional model 36 of the volume 22 to provide a transformed sub-volume. Block 76 may be performed between blocks 62 and 66 or between blocks 66 and 70.

For example, the controller 12 may apply the transformation algorithm X−1, Y−1 to the dimensions of the sub-volume 74 mentioned in the preceding paragraph to provide a transformed sub-volume extending between X=4.5 and X=5.5, Y=−1 and Y=9, and between Z=0 and Z=2. The controller 12 may store the transformed sub-volume in the memory 26.

At block 78, the method includes controlling movement of the robot 20 to not enter the sub-volume using the transformed sub-volume. Block 78 is performed during block 70 and while the robot 20 is moving from one position to another position. For example, the controller 12 may determine a path for moving the robot 20 from the first transformed position to the second transformed position where the path does not enter the transformed sub-volume.

The method illustrated in FIG. 5 may be advantageous in that the controller 12 may accurately control the robot 20 to avoid obstacles or other 'keep out zones' within the volume 22. This may increase the safety and accuracy of the apparatus 10 in moving from one position to another position.

It will be understood that the invention is not limited to the embodiments above-described and various modifications and improvements can be made without departing from the concepts described herein. For example, the different embodiments may take the form of an entirely hardware embodiment, an entirely software embodiment, or an embodiment containing both hardware and software elements.

Except where mutually exclusive, any of the features may be employed separately or in combination with any other features and the disclosure extends to and includes all combinations and sub-combinations of one or more features described herein.

I claim:

1. A method of controlling a robot within a volume, the method comprising:
   receiving a three dimensional model including a model of the robot and a model of the volume in which the robot is configured to move within, the volume having a sub-volume which the robot is not to enter;
   defining the sub-volume within the volume of the three dimensional model;
   defining a plurality of positions within the model of the volume to which the robot is moveable to, the plurality of positions being identified by an operator;
   receiving scanned three dimensional data of the robot and at least a part of the volume;
   determining a transformation algorithm using the three dimensional model and the scanned three dimensional data;
   applying the transformation algorithm to one or more positions of the plurality of positions to provide one or more transformed positions; and
   controlling movement of the robot using one or more of the transformed positions.

2. The method as claimed in claim 1, further comprising:
   applying the transformation algorithm to the sub-volume within the three dimensional model of the volume to provide a transformed sub-volume.

3. The method as claimed in claim 2, wherein controlling movement of the robot includes controlling movement of the robot to not enter the sub-volume using the transformed sub-volume.

4. The method as claimed in claim 1, wherein controlling movement of the robot includes controlling movement of the robot between a first transformed position and a second position.

5. The method as claimed in claim 4, wherein the second position is a second transformed position, or wherein the second position is a position of the plurality of positions.

6. The method as claimed in claim 1, further comprising:
   controlling a three dimensional scanner to scan the robot and at least a part of the volume to generate the scanned three dimensional data.

7. The method as claimed in claim 1, wherein the robot is a pick and place robot.

8. The method as claimed in claim 1, wherein the robot is a point to point robot.

9. An apparatus for controlling a robot within a volume, the apparatus comprising:
   a controller configured to:
     receive a three dimensional model including a model of the robot and a model of the volume in which the robot is configured to move within, the volume having a sub-volume which the robot is not to enter;
     define the sub-volume within the volume of the three dimensional model;
     define a plurality of positions within the model of the volume to which the robot is moveable to, the plurality of positions being identified by an operator;
     receive scanned three dimensional data of the robot and at least a part of the volume;
     determine a transformation algorithm using the three dimensional model and the scanned three dimensional data;
     apply the transformation algorithm to one or more positions of the plurality of positions to provide one or more transformed positions; and
     control movement of the robot using one or more of the transformed positions.

10. The apparatus as claimed in claim 9, wherein the controller is configured to apply the transformation algorithm to the sub-volume within the three dimensional model of the volume to provide a transformed sub-volume.

11. The apparatus as claimed in claim 10, wherein the controller is configured to control movement of the robot to not enter the sub-volume using the transformed sub-volume.

12. The apparatus as claimed in claim 9, wherein the controller is configured to control movement of the robot between a first transformed position and a second position.

13. The apparatus as claimed in claim 12, wherein the second position is a second transformed position, or wherein the second position is a position of the plurality of positions.

14. The apparatus as claimed in claim 9, wherein the controller is configured to control a three dimensional scanner to scan the robot and at least a part of the volume to generate the scanned three dimensional data.

15. The apparatus as claimed in claim 9, further comprising the robot, the robot being a pick and place robot.

16. The apparatus as claimed in claim 9, further comprising the robot, the robot being a point to point robot.

17. A non-transitory computer readable storage medium storing computer readable instructions that cause a computer to execute steps according to the method as claimed in claim 1.

18. A method of controlling a robot within a volume, the method comprising:
   receiving a three dimensional model including a model of the robot and a model of the volume in which the robot is configured to move within;
   defining a plurality of positions within the model of the volume to which the robot is moveable to, the plurality of positions being identified by an operator;
   receiving scanned three dimensional data of the robot and at least a part of the volume;
   determining a transformation algorithm using the three dimensional model and the scanned three dimensional data;
   determining a plurality of transformation algorithms for a plurality of sub-volumes within the volume respectively;
   applying the transformation algorithm to one or more positions of the plurality of positions to provide one or more transformed positions;
   applying the plurality of transformation algorithms to at least some of the plurality of positions to provide a plurality of transformed positions; and
   controlling movement of the robot using one or more of the transformed positions.

* * * * *